United States Patent [19]
Collins et al.

[11] Patent Number: 5,891,536
[45] Date of Patent: Apr. 6, 1999

[54] DESIGN IMPROVEMENTS TO VACUUM GLAZING

[75] Inventors: Richard Edward Collins, Riverstone; Jian-Zheng Tang, Merrylands, both of Australia

[73] Assignee: The University of Sydney, Sydney, Australia

[21] Appl. No.: 817,791

[22] PCT Filed: Sep. 28, 1995

[86] PCT No.: PCT/AU95/00640

§ 371 Date: Apr. 18, 1997

§ 102(e) Date: Apr. 18, 1997

[87] PCT Pub. No.: WO96/12862

PCT Pub. Date: May 2, 1996

[30] Foreign Application Priority Data

Oct. 19, 1994 [AU] Australia .................. PM8889

[51] Int. Cl.$^6$ .................................................. E04C 2/34
[52] U.S. Cl. .......................... 428/34; 52/786.13; 428/120
[58] Field of Search ............................. 428/34, 120, 192, 428/156; 52/786.1, 786.13; 156/107, 109

[56] References Cited

U.S. PATENT DOCUMENTS

| 1,370,974 | 3/1921 | Kirlin ........................................ 428/34 |
| 2,401,552 | 6/1946 | Cox ........................................ 20/56.5 |

(List continued on next page.)

FOREIGN PATENT DOCUMENTS

| 210 104 | 7/1957 | Australia . |
| 16618/67 | 7/1969 | Australia . |
| B-67280/87 | 11/1990 | Australia . |
| 61738/90 | 4/1991 | Australia . |
| PCT/AU90/00364 | 5/1991 | Australia . |
| 1290624 | 10/1991 | Canada . |
| 0 047 725 B1 | 12/1985 | European Pat. Off. . |
| 0 421 239 A2 | 4/1991 | European Pat. Off. . |
| 0 247 098 B1 | 3/1992 | European Pat. Off. . |
| 0 645 516 A2 | 3/1995 | European Pat. Off. . |
| 0489 042 B1 | 6/1996 | European Pat. Off. . |
| 2294315 | 12/1974 | France . |
| 2300860 | 10/1976 | France . |
| 2 367 180 | 5/1978 | France . |
| 2 483 564 | 12/1981 | France . |
| 387655 | 1/1924 | Germany . |
| 1 046 294 | 12/1958 | Germany . |
| 2 152 071 | 2/1973 | Germany . |
| 25 20 062 A1 | 11/1976 | Germany . |
| 29 51 330 A1 | 7/1981 | Germany . |
| 36 15 179 A1 | 2/1987 | Germany . |
| 5-302477 | 11/1993 | Japan . |
| 588 008 | 5/1977 | Switzerland . |
| 683855 | 12/1950 | United Kingdom . |
| 1 100 837 | 1/1968 | United Kingdom . |
| 1 108 593 | 4/1968 | United Kingdom . |
| WO 93/15296 | 9/1993 | WIPO . |
| WO 94/24398 | 10/1994 | WIPO . |
| WO 95/01493 | 1/1995 | WIPO . |

*Primary Examiner*—Donald Loney
*Attorney, Agent, or Firm*—Kennedy Covington Lobdell & Hickman

[57] ABSTRACT

Vacuum glazings and methods of manufacture thereof are described; the glazings provide improved shear stress resistance in that the vacuum glazing comprises two sheets of glass (2, 3), hermetically sealed around the edge (4), with a thermally insulating internal vacuum, and an array of support pillars (5) placed between the glass sheets (2, 3), wherein the pillars (5) consist of a core (13), made of a material of higher compressive strength, with at least one end covered by a layer of softer material (14). Alternatively, the vacuum glazing comprises two sheets of glass (2, 3), hermetically sealed around the edge (4), with a thermally insulating vacuum, and an array of support pillars (5) placed between the glass sheets (2, 3), wherein the array includes a small number of fused solder glass pillars located over the surface of the glazing, between pillars of higher compressive strength. Advantageously the support pillars (5) comprise two flat parallel ends (15, 16) shaped to provide stable equilibrium, and sides (17) shaped to provide unstable equilibrium, to ensure that the pillars when placed on a glass sheet will fall onto one of the flat faces (15, 16) and thereafter lie on that face.

20 Claims, 4 Drawing Sheets

U.S. PATENT DOCUMENTS

| | | | |
|---|---|---|---|
| 3,783,084 | 1/1974 | Quenett | 428/34 |
| 3,916,871 | 11/1975 | Estes et al. | 126/271 |
| 3,936,553 | 2/1976 | Rowe | 428/81 |
| 3,990,201 | 11/1976 | Falbel | 52/171 |
| 4,132,218 | 1/1979 | Bennett | 126/270 |
| 4,169,985 | 10/1979 | Ernsthausen et al. | 313/218 |
| 4,180,426 | 12/1979 | Oustin et al. | 156/64 |
| 4,367,108 | 1/1983 | Valimont et al. | 156/104 |
| 4,647,327 | 3/1987 | Rase | 156/103 |
| 4,683,154 | 7/1987 | Benson et al. | 428/34 |
| 4,786,344 | 11/1988 | Beuther | 156/109 |
| 5,009,218 | 4/1991 | Bächli | 156/109 |
| 5,107,649 | 4/1992 | Benson et al. | 52/39.4 |
| 5,124,185 | 6/1992 | Kerr et al. | 428/34 |
| 5,270,084 | 12/1993 | Parker | 428/34 |
| 5,657,607 | 8/1997 | Collins et al. | 52/786.13 |
| 5,664,395 | 9/1997 | Collins et al. | 52/786.13 |

DESIGN IMPROVEMENTS TO VACUUM GLAZING

INTRODUCTION

This invention concerns design improvements to vacuum glazing. Vacuum glazing consists of two sheets of glass, hermetically sealed around the edge, with a thermally insulating internal vacuum. In order to maintain the separation of the glass sheets under the influence of the large forces due to atmospheric pressure, an array of very small support pillars is placed over the surface of the glass sheets.

BACKGROUND OF THE INVENTION

The design of vacuum glazing involves a complex set of trade offs between thermal performance and stress. In particular, the support pillars serve to concentrate the forces due to atmospheric pressure, leading to high levels of stress in the glass in the immediate vicinity of the support pillars. Such stresses can lead to local fractures of the glass. Further, the glass sheets bend over the support pillars giving rise to regions of tensile stress on the external surfaces of the glass sheets immediately above the support pillars. In addition, the pillars themselves experience high levels of stress, and must be made out of a material which has a very high compressive strength. Finally, the support pillars themselves act as thermal bridges between the glass sheets, leading to heat flow through the glazing.

Substantial progress has been made in the design and manufacture of vacuum glazing over the last few years. Vacuum glazings up to 1 m×1 m have been produced with high levels of thermal insulation. It has been shown that reasonable design compromises can be achieved between the competing constraints associated with mechanical tensile stress on the one hand, and heat flow through the glazing on the other.

1. SHEAR STRESSES NEAR THE SUPPORT PILLARS

The support pillars concentrate the forces due to atmospheric pressure leading to high stresses in the glass and in the pillars. The nature of this stress concentration is well understood. The probability of fracture due to the concentrated forces can be determined by reference to the literature on indentation fracture of glass. In the design approach for vacuum glazing, dimensions of the pillar array are chosen to ensure that the formation of classical conical indentation fractures in the glass due to the support pillars should not occur.

Experience with the production of vacuum glazing has shown that there is another mode of fracture which can occur in the glass sheets near the support pillars. These fractures arise because of shear (sideways) stresses between the glass sheets and the pillars. The shear stresses are associated with in-plane movement of one glass sheet relative to another. Such movement can occur because of bending of the glass sheets, particularly complex bending modes in which the sheets are not deformed spherically, or because of temperature non-uniformities in either glass sheet. Either influence tends to cause the interface between the pillar and one glass sheet to move sideways relative to this interface on the other sheet. The large axial force between the pillars and the glass sheets prevents the contacting surfaces from moving relative to each other. This results in shear force between the support pillar and the glass sheets and leads to small crescent shaped fractures in the glass sheets adjacent to the pillars. The fact that these fractures are associated with shear stress can be confirmed by observing that they tend to be seen in pairs, on opposite edges of the support pillars in either glass sheet.

One of the reasons why these shear stresses occur is because, in practical designs of vacuum glazing, the support pillars must be made of material of very high compressive strength. If the pillars are not of high enough compressive strength, they deform inelastically during the establishment of the vacuum in the glazing, leading to large bending of the glass sheets in the vicinity of the edge seal. The fact that the support pillars are of high strength means that they do not deform significantly when shear forces are present.

1 SUMMARY OF THE INVENTION

According to a first aspect, as currently envisaged, the invention provides a vacuum glazing comprising two sheets of glass, hermetically sealed around the edge, with a thermally insulating internal vacuum, and an array of support pillars placed between the glass sheets to be in contact therewith, wherein the pillars are one piece elements consisting of a core or central body, made of a material of higher compressive strength, and at least one contact layer, made of softer metallic material, preferably selected from the group consisting of nickel, iron, chromium, copper, silver, gold, aluminium, alloys of these metals, or soft carbon, the contact layer arranged to provide an integral interface at at least one of the ends of the central body such as to absorb shear forces in the contact zone pillar—glass sheet. A pillar of this construction can have a very high compressive strength overall, provided that the contact layer of softer material on one or both ends of the core is relatively thin. However, since the softer material contact layer can deform more readily under shear than the core, a small amount of lateral sideways movement is possible. This reduces the magnitude of the stress in the glass plates, and thus decreases the chance of formation of a shear crack.

The dimensions of the support pillars are relatively non-critical. Typically, support pillars are 0.1 to 0.2 mm in height overall, and approximately 0.2 to 0.3 mm in diameter. The contact layer of soft material on one or both ends of the pillar can be up to 30 $\mu$m (0.03 mm) thick without causing stresses near the edge of the glazing which are too large. The materials of the cores and the soft contact layers are capable of withstanding the high temperature (about 500° C.) which is necessary for formation of the glazing edge seal without excessive oxidation or annealing. They are also compatible with the high internal vacuum.

One method to produce integral support pillars with a core and soft contact layer on one, or both contact ends of the pillar is to begin with a composite sheet of material consisting of a high strength central layer, and a soft layer on one, or both sides. The pillars are then formed from this sheet by conventional techniques. The pillars can be made mechanically, by stamping, punching, abrading or sawing the composite sheet. Alternatively they can be chemically or electrolytically etched from the sheet using photolithographic methods.

An alternative way of producing the pillars is to deposit the soft layer after the formation of the hard cores. The layer can be deposited using conventional electrolytic, or electroless plating methods. In this case, the soft layer also coats the sides of the pillars, but this does not affect the operation of the soft layer on the ends. Pillars of this type can also be made by plastically deforming a hard core into a flat disk. The core may be coated with soft material either before, or after the deformation process.

A further advantage of the composite pillar construction described here is that it ensures that the ends of the pillars contact the glass uniformly over the entire contact area of the pillar. There is some evidence that very hard pillars can not be manufactured with entirely plain flat contact surfaces and therefore do not contact the glass uniformly and that this increases the local stresses in the glass, thus increasing the chance of fracture. The small deformation that occurs in the soft material on the end of the pillars overcomes this problem.

According to an alternative aspect of the invention, which is believed to also solve above mentioned problems related to shear stresses, there is provided a vacuum glazing comprising two sheets of glass, hermetically sealed around the edge, with a thermally insulating vacuum, and an array of support pillars placed between the glass sheets to be in contact therewith, wherein the array consists of a small number of first support pillars, made solely of fused solder glass, and a majority number of second support pillars of high compressive strength, the first support pillars being distributed between the second support pillars over the entire surface of the glazing and arranged in use, to absorb shear forces and reduce the magnitude of these forces on the second support pillars. The majority number of second pillars of higher compressive strength can be ceramic or high strength metal pillars. The fused solder glass pillars may be formed during the same process that makes the hermetic solder glass edge seal around the periphery of the glass sheets. The solder glass pillars make a strong mechanical bond to the internal surfaces of both glass sheets. When shear is present in the vacuum glazing, the solder glass pillars can absorb the shear forces, reducing the magnitude of these forces on the majority of the pillars.

The solder glass pillars may be larger than the 0.2 to 0.3 mm diameter typically used for support pillars, to be strong enough to absorb the shear forces. Only a relatively small proportion of the pillars will usually be made from solder glass, otherwise a substantial increase in the thermal conductance of the vacuum glazing will occur due to heat flow through these pillars. Up to about 10% of the pillars can be made from solder glass without resulting in too large an increase in the thermal conductance of the glazing associated with heat flow through the support pillars.

Typical dimensions of the solder glass pillars are up to 2 mm in diameter, although generally these pillars would be smaller than this—no more than 1 mm in diameter. The glass from which the solder glass pillars are made can be highly transparent, so that these pillars do not result in a substantial degradation of the optical properties of the glazing.

2. DESIGN OF THE SUPPORT PILLARS

A typical vacuum glazing contains a large number of mechanical support pillars—approximately 1500 per m$^2$. These pillars must be placed on the surface of the glazing using an automated technique. Typical dimensions of the pillars are 0.2 to 0.3 mm in diameter, and 0.1 to 0.2 mm high. Satisfactory vacuum glazing requires that the height of all the support pillars should be very nearly the same. If this is not the case, substantial stresses occur in the glass sheets of the glazing near the contact of those pillars which are slightly higher than the adjacent pillars. Vacuum glazing has been made with pillars having round ends (cylinders) or square ends (square or rectangular prisms).

During the manufacture of vacuum glazing, it is extremely important that all pillars should lie on the surface of the glass in the same orientation. For example, for cylindrical pillars, the flat end faces of the pillars must contact the glass with the axis of the pillar perpendicular to the glass. If a pillar should lie on the glass on its edge, the height of this pillar will be different than its neighbours, and large stresses will develop in the glass sheets when the vacuum is applied. It is therefore very important that all of the pillars should lie on the surface of the glass sheet in the orientation for which they are designed.

2. SUMMARY OF THE INVENTION

According to another aspect, as currently envisaged, the invention provides a support pillar for vacuum glazing, comprising two flat parallel ends shaped to provide stable equilibrium, and sides shaped to provide unstable equilibrium, to ensure that the pillars when placed on a glass sheet will fall onto one of the flat faces and thereafter lie on that face. The sides can be curved outwards in a cuspodial shape, or tapered outwards. The cuspodial or tapered shape can be symmetric with respect to both sides of the pillars, or asymmetric, with one face of the pillar larger than the other.

The pillars may have circular cross-section; alternatively the pillars may have other cross-sectional shapes including squares, rectangles, polygons or irregular shapes.

This aspect of the invention also incorporates vacuum glazing comprising two sheets of glass, hermetically sealed around the edge, with a thermally insulating internal vacuum, and an array of support pillars placed between the glass sheets, wherein the support pillars each comprise two flat parallel ends shaped to provide stable equilibrium, and sides shaped to provide unstable equilibrium, to ensure that the pillars when placed on a glass sheet will fall onto one of the flat faces and thereafter lie on that face.

3. VACUUM GLAZING STRUCTURE

The manufacture of vacuum glazing requires that the temperature of the glass sheets forming the glazing be held at a high value whilst the solder glass edge seal is formed. This process essentially prevents the use of heat tempered glass for the manufacture of glazing, because the high temperature edge forming process removes most of the temper from the glass. It is also not possible to use conventional laminated glass for the glazing because the temperatures required for formation of the edge seal cause the plastic adhesive in laminated glass to deteriorate.

3. SUMMARY OF THE INVENTION

According to another aspect, as currently envisaged, the invention provides vacuum glazing comprising two sheets of glass, hermetically sealed around the edge, with a thermally insulating internal vacuum, and an array of support pillars placed between the glass sheets, wherein at least one of the sheets of glass is laminated after the vacuum glazing has been manufactured.

According to a further aspect, as currently envisaged, the invention provides a method of manufacturing vacuum glazing, comprising the steps of:

holding the glass sheets at a high temperature while a solder glass edge seal is formed; and subsequently laminating at least one of the glass sheets with a further sheet of glass.

This procedure may consist of placing a layer of plastic material on one surface of the glazing, and then locating the further glass sheet above this material. The entire assembly is forced together, and then heated to a temperature at which the plastic material softens and bonds to both sheets. The lamination may be performed on one side of the glazing only, or on both sides, as desired. This method of manufacture overcomes the problems associated with the inability of the laminated glass to withstand the high temperature edge sealing process. The vacuum glazing itself is, however, quite capable of withstanding the relatively low temperatures associated with the formation of the bonding between the glass sheets during the laminating process.

BRIEF DESCRIPTION OF DRAWINGS

The invention will now be described, by way of example only, with reference to the accompanying drawings, in which:

FIG. 1b is a cross-sectional view of the glazing of FIG. 1a;

BEST MODE FOR CARRYING OUT THE INVENTION

Figure 1A:
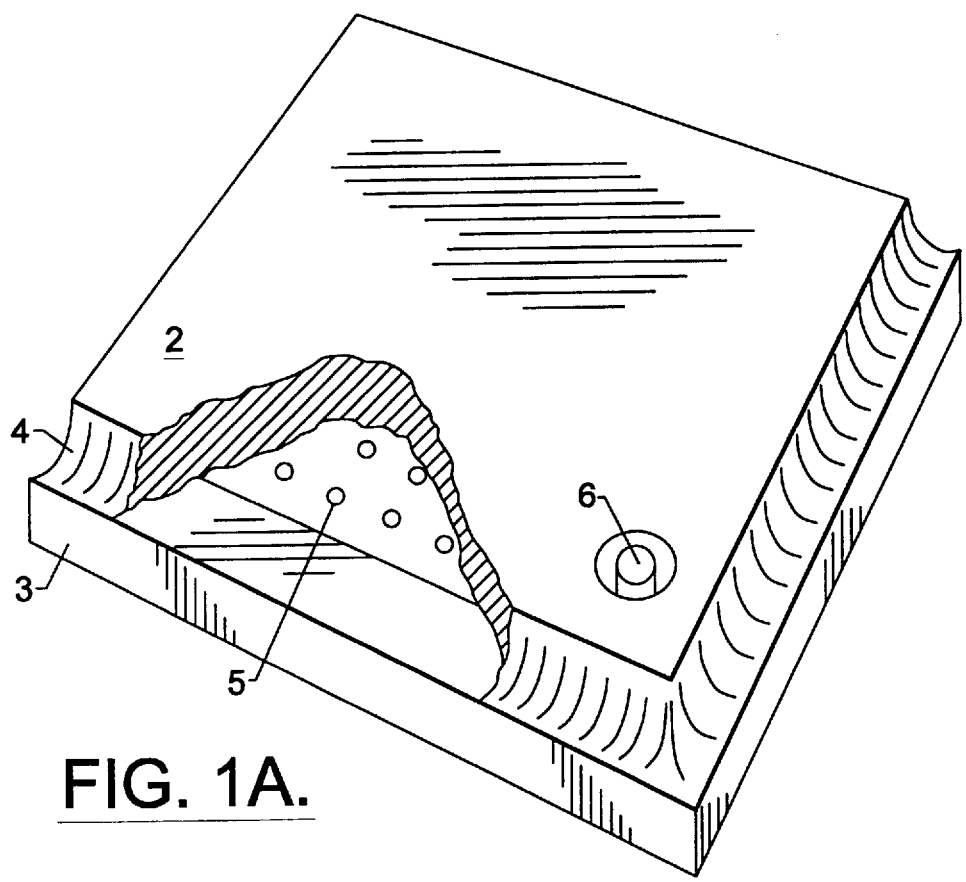
FIG. 1a is a perspective view of conventional vacuum glazing.
Figure 1B:
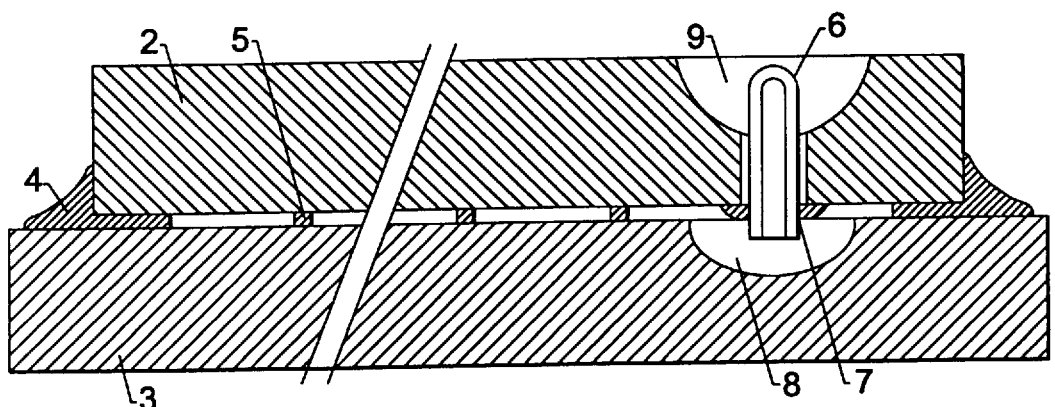

Referring now to FIG. 1 vacuum glazing 1 comprises two sheets of glass 2 and 3, hermetically sealed around the edge with a solder glass seal 4 to enclose a vacuum. An array of support pillars 5 placed between the glass sheets maintains their separation against the large forces due to atmospheric pressure. Internal transparent low emittance coatings on one, or both of the glass sheets, may be used to reduce radiative heat transport to low levels.

The vacuum will often be established after formation of the structure by pumping atmosphere from between the sheets out through a pump-out tube 6. Pump-out tube 6 will be sealed into a hole in glass sheet 2 by the use of a solder glass seal 7. A cavity 8 is machined into the other glass sheet 3 in registration with the end of the pump-out tube in order to accommodate it in a small place provided between the sheets of glass. A second cavity 9 machined into the outer face of the first glass sheet 2 accommodates the external stump of the pump-out tube 6 after it has been tipped-off and closed, following its use to evacuate the panel.

Figure 2:
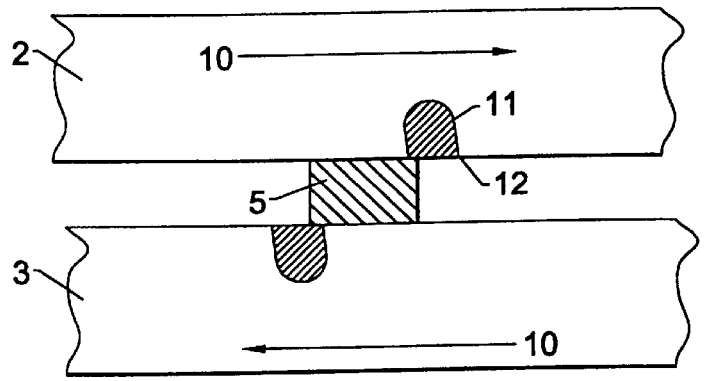
FIG. 2 is a scratch-section illustrating the formation of crescent cracks due to shear forces.

Sideways, or shear stresses between the glass sheets and the pillars will arise when there are in-plane movements of one glass sheet relative to the other. These movements occur during bending of the glass sheets or as a result of temperature differences between the sheets. As shown in FIG. 2 this results in shear forces 10 building up between the support pillars and the glass sheets, and to regions of high tensile stress 11. Small crescent shaped cracks 12 can arise and be observed in pairs on opposite edges of the support pillars in either glass sheet.

COMPOSITE PILLARS

Figure 3:
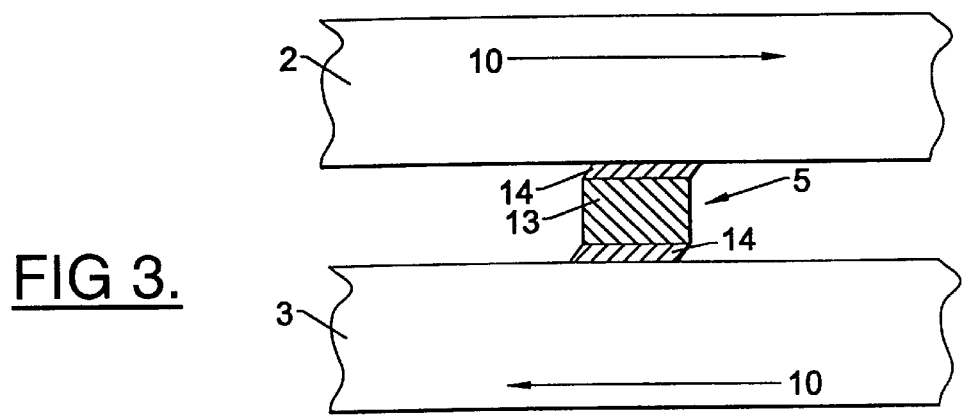
FIG. 3 is a scratch-section illustrating a first aspect of the present invention.

Referring now to FIG. 3, the support pillar 5 is of a composite design having a high compressive strength core 13, and soft ends 14. This pillar has a very high compressive strength overall, provided that the layers of soft material on either end are relatively thin. However, under shear the soft material can deform permitting a small amount of lateral sideways movement, and reducing the magnitude of the stress in the glass sheets and decreasing the chance of formation of shear cracks.

The support pillars are usually 0.1 to 0.2 mm in height overall, and approximately 0.2 to 0.3 mm in diameter. Layers of soft material 14 can be up to 30 $\mu$m thick without causing stresses near the edge of the glazing which are too large. The materials of the pillars and the soft layers are capable of withstanding about 500° C. which is experienced during the formation of the edge seal, without excess of oxidation or annealing. The materials must also be compatible with high internal vacuum, and metals such as nickel, iron, chromium, copper, silver, gold, aluminium, and alloys of these metals, and in addition soft films of carbon may be used for the soft material 14.

Figure 4:
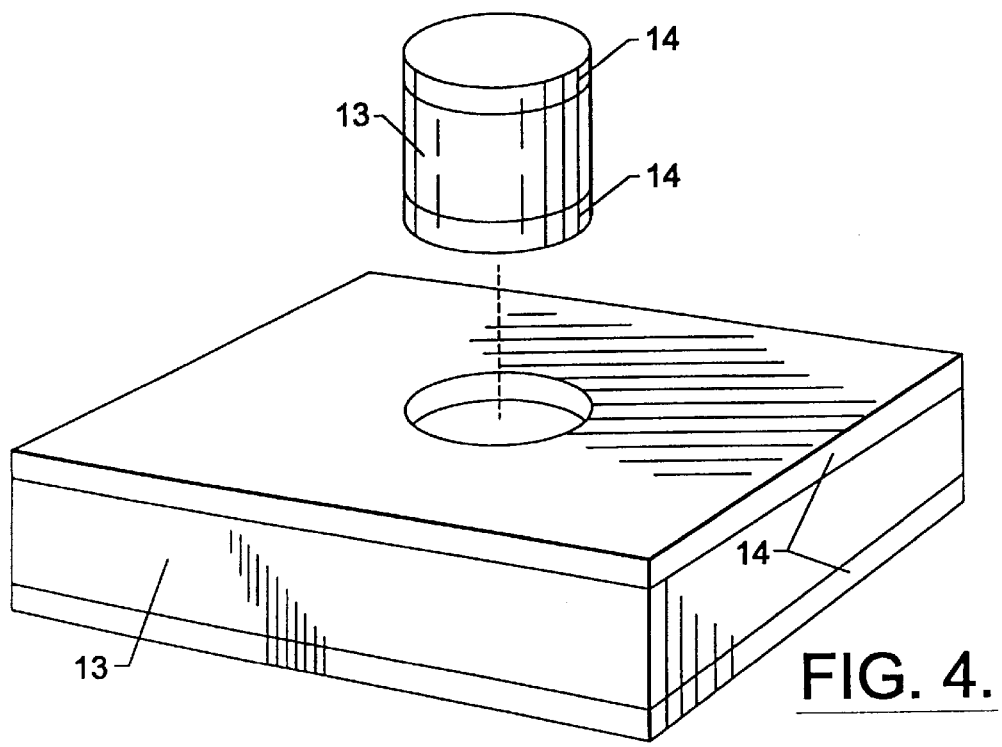
FIG. 4 illustrates a method of making a composite pillar for the first aspect of the present invention, from a laminated sheet of high strength material and soft material.

Composite support pillars may be produced, as indicated in FIG. 4, from a composite sheet of material consisting of a high strength central layer 13 and a soft layer 14 on one or both sides. The pillars 5 are then formed from this sheet by stamping, punching, abrading or sawing, or other mechanical means. Alternatively they may be chemically or electrolytically etched from the sheet using photolithographic methods.

Figure 5:
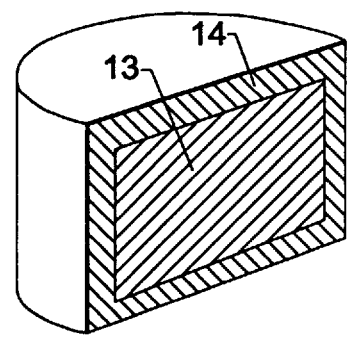
FIG. 5 illustrates a method of making a composite pillar for a first aspect of the present invention, from an individual high strength core.
Figure 6A:
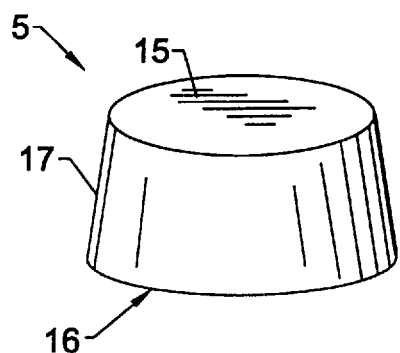
FIGS. 6a, b, c and d illustrates examples of the design of support pillars embodying a further aspect of the present invention.
Figure 6B:
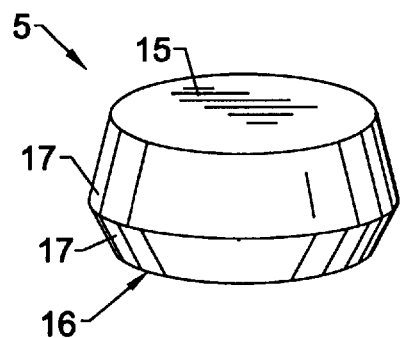
Figure 6C:
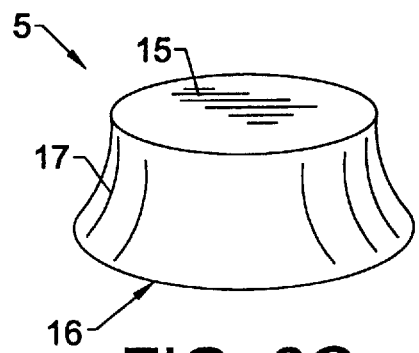
Figure 6D:
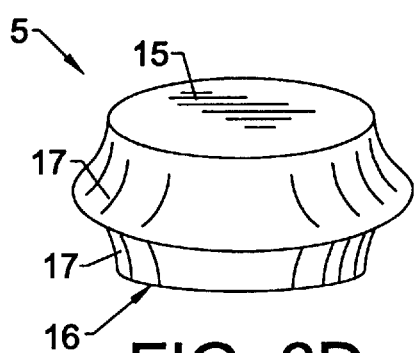

An alternative way of producing pillars is to deposit the soft layer 14 after the formation of the hard cores 13. As shown in FIG. 5 the layer can be deposited using conventional electrolytic or electrolysis plating methods. In this case, the soft layer also coats the sides of the pillars, but this does not affect the operation of both layers on the ends. Pillars of this type can also be made by plastically deforming a hard core into a flat disk. The core may be coated with soft material either before or after the deformation process.

FUSED SOLDER GLASS PILLARS

Some of the pillars 5 may be made of fused solder glass, while the majority of the pillars may be made of a material having a high compressive strength, such as ceramic or high strength metal. The fused solder glass pillars may be formed during the same process that makes the hermetic solder glass edge seal around the periphery of the glass sheets.

The solder glass pillars make a strong mechanical bond to the internal surfaces of both glass sheets. When shear is present in the vacuum glazing, the solder glass pillars can absorb the shear forces, reducing the magnitude of these forces on the majority of the pillars.

The solder glass pillars are larger than the 0.2 to 0.3 mm diameter typically used for support pillars, to be strong enough to absorb the shear forces. Only a relatively small proportion of the pillars will usually be made from solder glass, otherwise a substantial increase in the thermal conductance of the vacuum glazing will occur due to heat flow through these pillars. Up to about 10% of the pillars are made from solder glass without resulting in too large an increase in the thermal conductance of the glazing associated with heat flow through the support pillars.

The solder glass pillars are up to 2 mm in diameter, although generally these pillars would be smaller than this—no more than 1 mm in diameter. The glass from which the solder glass pillars are made can be highly transparent, so that these pillars do not result in a substantial degradation of the optical properties of the glazing.

DESIGN OF SUPPORT PILLARS

Referring now to FIG. 6, the support pillars 5 comprising two flat parallel ends 15 and 16 shaped to provide stable equilibrium, and sides 17 shaped to provide unstable equilibrium, to ensure that the pillars when placed on a glass sheet will fall onto one of the flat faces and thereafter lie on that face.

The sides 17 are tapered outwards in FIG. 6(*a*) with one end larger than the other. In FIG. 6(*b*) the sides taper from both ends in a cuspodial shape. In FIG. 6(*c*) the sides are curved and in FIG. 6(*d*) the sides are curved from both ends in a cuspoidal shape.

VACUUM GLAZING STRUCTURE

Figure 7A:
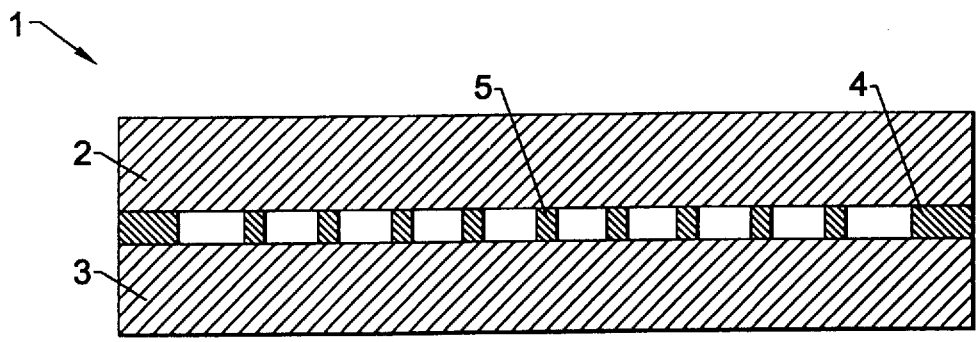
FIGS. 7a, b and c illustrates steps in the manufacture of a laminated vacuum glazing.
Figure 7B:
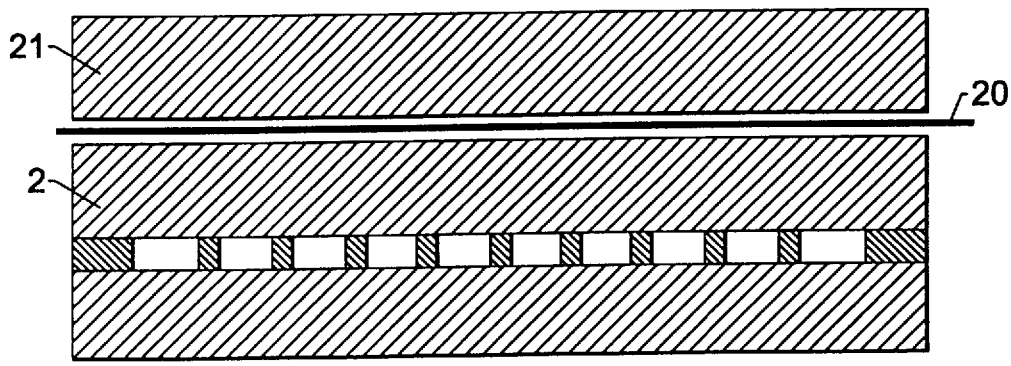
Figure 7C:
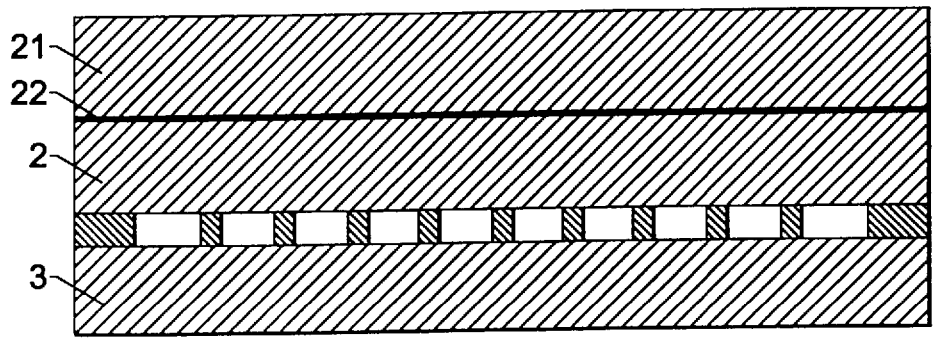

In FIG. 7 the steps in a process of producing a laminated evacuated panel are illustrated. First the evacuated panel is produced as shown in FIG. 7(*a*). Then a layer of plastic laminate material 20 is placed on one surface of the glazing. A further glass sheet 21 is located above this material as shown in FIG. 7(*b*). The entire assembly is forced together, and then heated to a temperature at which the plastic material 20 softens and bonds to both sheets of glass 2 and 21 as shown in FIG. 7(*c*). The laminating process may be performed on one or both sides of the glazing to produce a laminated evacuated panel.

Although this invention has been described with reference to specific embodiments it should be appreciated that it could be embodied in other forms. A glazing structure may incorporate one or more of the improvements according to the aspects of the invention.

We claim:

1. Vacuum glazing comprising two sheets of glass, hermetically sealed around edges thereof, with a thermally insulating vacuum therebetween, and an array of support pillars placed between said glass sheets, each support pillar of said array having two flat parallel stand faces and sides curved outward in a cuspoidal shape extending therebetween.

2. Vacuum glazing according to claim 1, wherein each said pillar is circular in cross-section.

3. Vacuum glazing according to claim 1, wherein said sides of each said pillar are symmetric with respect to both said stand faces of said pillar.

4. Vacuum glazing comprising two sheets of glass, hermetically sealed around edges thereof, with a thermally insulating vacuum therebetween, and an array of support pillars placed between said glass sheets, each support pillar of said array having two flat parallel stand faces and tapering sides extending therebetween.

5. Vacuum glazing according to claim 4, wherein each said pillar is circular in cross-section.

6. Vacuum glazing according to claim 4, wherein said sides of each said pillar are symmetric with respect to both said stand faces of said pillar.

7. Vacuum glazing comprising two sheets of glass that are hermetically sealed around edges thereof and that include a thermally insulating vacuum therebetween, and an array of support pillars each extending between said glass sheets and including two parallel flat stand faces engaging respective said glass sheets, each said support pillar further having a cross-section disposed between and parallel to said stand faces that is larger than at least one of said stand faces.

8. Vacuum glazing according to claim 7, wherein said stand faces are coaxial.

9. Vacuum glazing according to claim 7, wherein said cross-section is circular.

10. Vacuum glazing according to claim 7, wherein each said pillar includes at least one side extending between said stand faces which is curved outwards in a cuspodial shape.

11. Vacuum glazing according to claim 7, wherein each said pillar includes at least one side extending between said stand faces which is convex in shape.

12. Vacuum glazing according to claim 7, wherein each said pillar includes at least one side extending between said stand faces which tapers outward.

13. Vacuum glazing comprising two sheets of glass that are hermetically sealed around edges thereof and that include a thermally insulating vacuum therebetween, and an array of support pillars each extending between said glass sheets and including two parallel flat stand faces engaging respective said glass sheets, each said support pillar further having cross-sections parallel to said stand faces which increase in dimension along a direction extending away from at least one of said stand faces toward the other of said stand faces.

14. Vacuum glazing according to claim 13, wherein said stand faces are coaxial.

15. Vacuum glazing according to claim 13, wherein cross-sections are circular.

16. Vacuum glazing according to claim 13, wherein each said pillar includes at least one side extending between said stand faces which is curved outwards in a cuspodial shape.

17. Vacuum glazing according to claim 13, wherein each said pillar includes at least one side extending between said stand faces which tapers outward.

18. Vacuum glazing comprising two sheets of glass hermetically sealed around edges thereof, with a thermally insulating vacuum therebetween, and an array of support pillars placed between said glass sheets, each support pillar of said array having:
   (i) two substantially flat parallel stand faces which respectively engage said glass sheets when in a proper disposition between said glass sheets, and
   (ii) means for orienting each said pillar into said proper disposition when each said pillar is placed between said glass sheets, said orientation means comprising at least one side extending between said stand faces having a cross-section disposed between and parallel to said stand faces that is larger than at least one of said stand faces.

19. Vacuum glazing according to claim 18, wherein said orientation means is cuspodial or tapered in shape.

20. Vacuum glazing according to claim 18, wherein said stand faces of each said pillar are coaxial.

* * * * *